United States Patent
Fosseide et al.

(10) Patent No.: US 8,249,364 B2
(45) Date of Patent: Aug. 21, 2012

(54) METHOD FOR RESOLVING CONTRADICTING OUTPUT DATA FROM AN OPTICAL CHARACTER RECOGNITION (OCR) SYSTEM, WHEREIN THE OUTPUT DATA COMPRISES MORE THAN ONE RECOGNITION ALTERNATIVE FOR AN IMAGE OF A CHARACTER

(75) Inventors: Knut Tharald Fosseide, Kolbotn (NO); Hans Christian Meyer, Oslo (NO)

(73) Assignee: Lumex AS, Oslo (NO)

( * ) Notice: Subject to any disclaimer, the term of this patent is extended or adjusted under 35 U.S.C. 154(b) by 233 days.

(21) Appl. No.: 12/743,899

(22) PCT Filed: Nov. 19, 2008

(86) PCT No.: PCT/NO2008/000411
§ 371 (c)(1),
(2), (4) Date: Jul. 7, 2010

(87) PCT Pub. No.: WO2009/067022
PCT Pub. Date: May 28, 2009

(65) Prior Publication Data
US 2010/0272359 A1 Oct. 28, 2010

(30) Foreign Application Priority Data
Nov. 20, 2007 (NO) .................................. 20075958

(51) Int. Cl.
*G06K 9/00* (2006.01)
(52) U.S. Cl. ......... 382/218; 382/209; 382/181; 382/224
(58) Field of Classification Search .................. 382/181, 382/218, 231, 286, 292
See application file for complete search history.

(56) References Cited

U.S. PATENT DOCUMENTS 5,883,986 A * 3/1999 Kopec et al. .................. 382/310
6,104,833 A 8/2000 Naoi et al.
(Continued)

FOREIGN PATENT DOCUMENTS
EP 0745952 B1 10/2001
(Continued)

OTHER PUBLICATIONS

English Translation of Decision of Grant for Russian Patent Application No. 2010124997.
(Continued)

*Primary Examiner* — Bhavesh Mehta
*Assistant Examiner* — Edward Park
(74) *Attorney, Agent, or Firm* — Pearl Cohen Zedek Latzer, LLP (57) ABSTRACT

The present invention is related to a method for resolving contradicting output data from an Optical Character Recognition (OCR) system providing a conversion of pixelized documents into computer coded text as the output data, wherein the OCR output data comprises at least a first and second character listed as being likely candidates for an exemplar of a same sampled character instance from the pixelized document, by providing steps that identify locations of differences in graphical appearance between the candidate characters, and then using the location information to identify a corresponding locations in the sampled character instance. Based on correlation technique, this location information is used to select the correct candidate character as the identification of the sampled character instance.

20 Claims, 10 Drawing Sheets

U.S. PATENT DOCUMENTS

| | | | |
|---|---|---|---|
| 6,111,984 A | 8/2000 | Fukasawa | |
| 6,351,546 B1 * | 2/2002 | Murayama et al. | 382/112 |
| 6,470,336 B1 * | 10/2002 | Matsukawa et al. | 707/4 |
| 6,701,016 B1 | 3/2004 | Jojic et al. | |
| 7,149,347 B1 | 12/2006 | Wnek | |
| 8,111,927 B2 * | 2/2012 | Vincent et al. | 382/225 |
| 2003/0194134 A1 | 10/2003 | Wenzel et al. | |
| 2008/0063279 A1 * | 3/2008 | Vincent et al. | 382/182 |

FOREIGN PATENT DOCUMENTS

| | | |
|---|---|---|
| EP | 1282076 | 2/2003 |
| EP | 1818857 A2 | 8/2007 |
| RU | 63571 U1 | 5/2007 |
| WO | WO 2007/094684 | 8/2007 |

OTHER PUBLICATIONS

International Search Report, issued Feb. 5, 2009, for Internation Application No. PCT/NO2008/000411.

Written Opinion, issued Feb. 5, 2009, for Internation Application No. PCT/NO2008/000411.

\* cited by examiner

METHOD FOR RESOLVING CONTRADICTING OUTPUT DATA FROM AN OPTICAL CHARACTER RECOGNITION (OCR) SYSTEM, WHEREIN THE OUTPUT DATA COMPRISES MORE THAN ONE RECOGNITION ALTERNATIVE FOR AN IMAGE OF A CHARACTER

CROSS-REFERENCE TO RELATED APPLICATIONS

This application is a National Phase Application of PCT International Application No. PCT/NO2008/000411, International Filing Date Nov. 19, 2008, claiming priority of Norwegian Patent Application NO 20075958, filed Nov. 20, 2007, which are hereby incorporated by reference in their entirety.

FIELD OF THE INVENTION

The present invention is related to resolving contradicting output data from an Optical Character recognition (OCR) system, and especially to a method for processing OCR output data, wherein the output data comprises more than one recognition alternative for an image of a character.

BACKGROUND OF THE INVENTION

Optical character recognition systems provide a transformation of pixelized images of documents into ASCII coded text which facilitates searching, substitution, reformatting of documents etc. in a computer system. One aspect of OCR functionality is to convert handwritten and typewriter typed documents, books, medical journals, etc. into for example Internet or Intranet searchable documents. Generally, the quality of information retrieval and document searching is considerably enhanced if all documents are electronically retrievable and searchable. For example, a company Intranet system can link together all old and new documents of an enterprise through extensive use of OCR functionality implemented as a part of the Intranet (or as part of the Internet if the documents are of public interest).

However, the quality of the OCR functionality is limited due to the fact that the complexity of an OCR system is huge. It is difficult to provide an OCR functionality that can solve any problem encountered when trying to convert images of text into computer coded text. One example of a problem that often occurs is that the OCR system may not distinguish correctly between characters because their images in the text seem to be equal. For example the character 'c' can easily be interpreted as a 'e', or vice versa, if the distinguishing details are blurred, which may be due to dirt or aging etc. of a page comprising the characters. Such problems are usually identified by an OCR program since the OCR system can establish for example a probability (or score value) for the certainty of the recognition of a specific character. For example, when two or more characters has a probability of being substantially equal possible candidates as an identification of an image of a character, these alternative candidate characters are reported, for example in a list being part of the OCR output data, together with a corresponding list of words comprising the uncertainly recognized characters identified by the OCR system. Sometimes several characters can be uncertainly recognized in the same word, which amplifies the problem of identifying which candidate characters are the correct ones, and thereby the words themselves.

SUMMARY OF THE INVENTION

According to an aspect of the present invention such ambiguities regarding selecting a correct candidate character amongst several candidate characters may be solved by investigating differences of graphical appearance actually encountered in the images of the candidate characters as present in the document comprising the characters, and using these identified graphical different appearances to identify which aspects of the differences are present in the image of the uncertainly recognized character. The key point of this aspect of the present invention is not that the graphical appearance of differences of the candidate characters as such is identified. The important aspect of the present invention is to identify which locations of areas in the image of the candidate characters wherein the areas comprise differentiating features. By using the information about the location or area of a differentiating aspect, the same location or area can be identified in the uncertainly recognized character. By comparing the same locations or areas amongst the candidate character images and the image of the uncertainly recognized character it is possible to decide which candidate character amongst all the character candidates that are the correct identification for the uncertainly recognized character.

According to another aspect of the present invention, the location or area information about differentiating aspects of candidate character images and uncertainly recognized characters can be referenced consistent throughout all the images of the individual respective images of the characters when the images are aligned with respect to each other such that as much as possible of the characters themselves are positioned on top of each other when the images are viewed as being placed on top of each other. To achieve this alignment, displacements between the different images can be calculated, for example by correlating combinations of images.

According to an example of embodiment of the present invention, a method comprising steps identifying images of characters in a pixelized document that are certainly recognized is used to create a template set of character images encountered in the pixelized document, and all images identified for a same character is added together pixel by pixel and weighted with the number of images used to form a class for this character. Images of the different classes are used as the template images in steps of the present invention. A sampled character image instance that is reported to have multiple, for example at least two, alternative candidate characters as a choice for a correct identification of the sampled character image instance, is correctly selected and identified amongst the candidate characters by steps comprising comparing the images of the candidate characters with the set of template images identifying which one of the template images that most probable represents the uncertainly recognized character.

DETAILED DESCRIPTION OF THE INVENTION

Figure 1A:
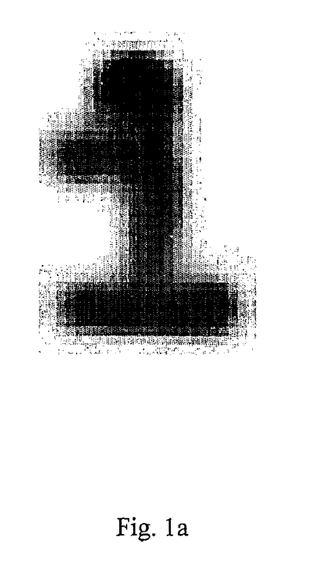
FIG. 1a and FIG. 1b illustrates examples of 'i' and '1' templates.
Figure 1B:
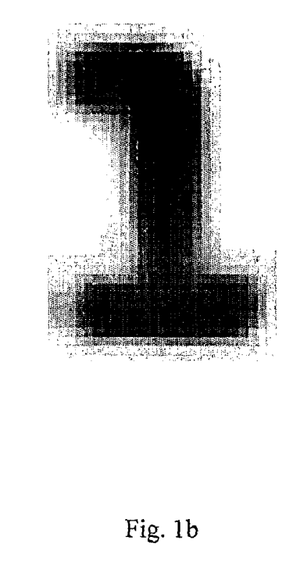

The present invention will be described in detail with reference to an example of embodiment comprising uncertainly recognized characters from images representing the characters i and 1, respectively. According to an aspect of the present invention, character templates are identified from the document itself that is currently being processed in an OCR system. In this manner, all characteristics of characters as they actually appear in the document will be part of the templates representing the characters. FIG. 1a and FIG. 1b illustrates an example of templates identified by an OCR process as being characters recognized with a certainty above a preset threshold level, and which are identified as images representing the characters i and 1, respectively.

A pixel coded image of a character comprises pixels in a matrix pattern with grey level coding of the pixels represented as the matrix cells. An example of an image of a character may comprise only white and black colours. The white parts are the background which represents the paper, while the black parts represent the graphical imprint of the characters on the paper. However, as known to a person skilled in the art, real images of characters may comprise all grey levels that are possible to represent in the dynamic range provided by the pixel format, and straight lines are seldom visualized as straight lines, but rather as a jigsaw puzzle of pixels when investigated on a pixel level. Therefore, image processing methods needs to investigate individual pixels, clusters of pixels, connected pixels etc., and also be able to compare parts of images, for example images of characters identified on a page. Therefore, to be able to reference different parts of an image on a document page, a coordinate system is necessary. A coordinate system with an origin defined by a corner of a document page can be used. However, image processing involving for example a comparison of an image of a character from one location on the page with another image of another character on another location on the page would require huge amounts of transformations of ordered number pairs referencing all the different pixels, groups of pixels and connected pixels, etc. Further, whenever an image of a character is retrieved from an image of a document page, a bonding box must be provided around the graphical imprint representing the character. The problem is then to be able to reference pixels of a character inside one bounding box, and then reference the pixels located at the same spot in another bonding box comprising an imprint of another character.

According to an example of embodiment of the present invention, cross-referencing pixel locations in different bounding boxes is provided for by a process comprising correlating the images bounded by the respective bounding boxes, and based on the correlation a displacement between the images can be calculated. The different images can then be aligned relative to each other based on the amount provided by the calculated displacements, as known to a person skilled in the art.

Figure 2:
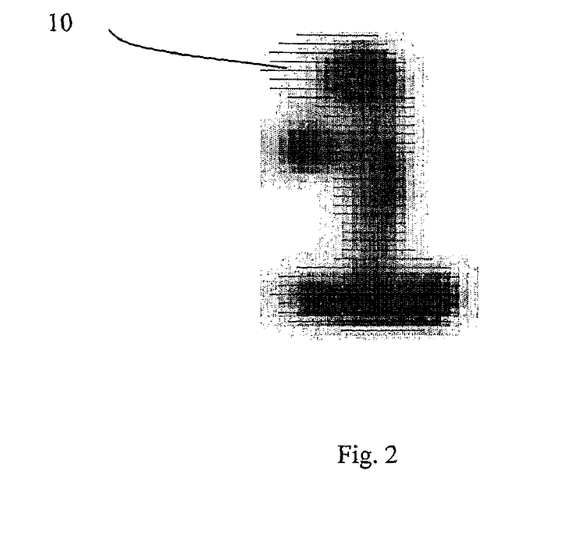
FIG. 2 illustrates displacement between the templates in FIG. 1

An example of a method for the processing of contradicting output data according to the present invention comprises correlating the exemplar of the uncertainly recognized sampled character image instance with images from the set of templates generated from images encountered in the document of characters recognized with a confidence level above a preset threshold level. The purpose of this correlation is to identify which one of the template images that most resembles the sampled character instance. For example, the two images of i and 1, respectively, in FIG. 1 are identified. These two images are then correlated to identify a first displacement between the two images. FIG. 2 illustrates an alignment of these images by using the identified displacement (or offset) between the images. In FIG. 2 are all pixels that are "on" in the image in FIG. 1b illustrated with black lines. The alignment may be illustrated as placing one image on top of the other. An important aspect of the displacement and alignment process according to the present invention is that the location of a specific part of one of the images can be related to parts on the same location in the other aligned image. In this manner it is possible to identify areas that differ from each other in the respective images of the characters. For example, comparing an image of the character i and an image of the character 1 is much easier if the stem of the two characters are placed directly on top of each other. The part of each character that is different from the other character is then easy to identify, both as a referable collection of pixels or connected pixels as well as individual referable pixels. FIG. 2 illustrates such a difference area 10 visualized with solid black lines in the upper left corner of the aligned image. The displacement is an ordered pair of numbers for example, wherein the first number is the displacement in the up/down direction while the other number is the displacement in the left/right direction relative to the bounding box. The displacement in the example in FIG. 2 is (0,−1) indicating that there is no displacement in the up/down direction while there is a displacement of one pixel to the left in the left/right direction. When for example two images have been aligned, the two bonding boxes related to each of the two respective images may no longer overlap. It may be only the common parts (for example the stem as discussed above) that overlaps. In such circumstances it is possible to create a common bounding box around the aligned images, as known to a person skilled in the art.

Figure 3:
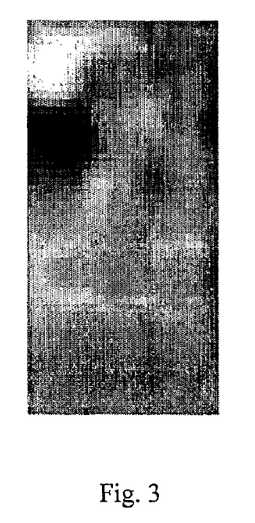
FIG. 3 illustrates an example of difference matrix according to the present invention.

According to an example of embodiment of the present invention, differences between images representing candidate characters may be identified by converting the aligned images, for example the aligned images depicted in FIG. 2, into a difference matrix. FIG. 3 illustrates such a difference matrix generated from the images in FIG. 2. A matrix element in the difference matrix is created by subtracting pixel values (grey level values) in corresponding locations from the aligned images and placing the subtracted value in correspondingly located matrix elements. FIG. 3 illustrates the subtraction of the images representing the templates for i and 1 by subtracting i from 1 (1−i).

Figure 4:
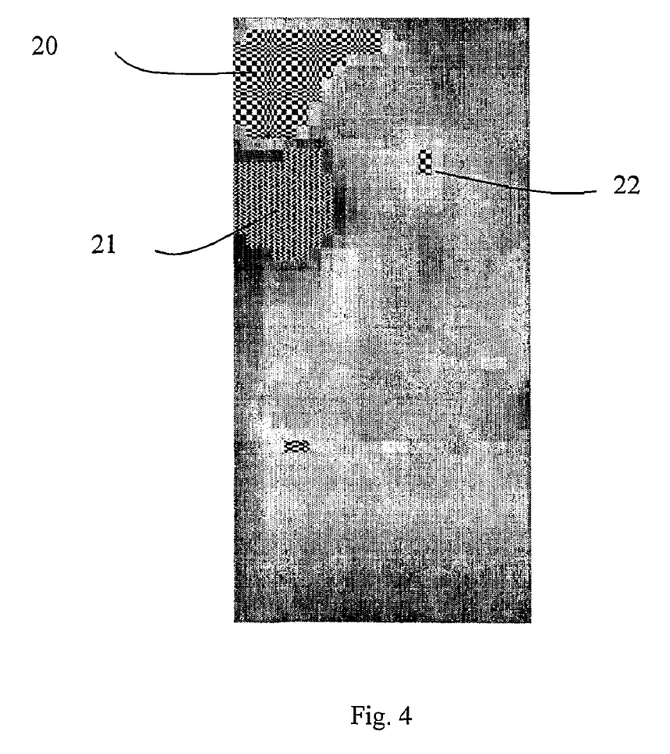
FIG. 4 illustrates positive and negative areas in the matrix in FIG. 3.

As can be seen, most of the pixels in the matrix in FIG. 3 are close to zero, only regions where the templates have significantly different appearance will have large positive or negative values in corresponding matrix element. FIG. 4 illustrates the areas in FIG. 3 as a positive area 20 indicating character 1 dominance in this area, while a negative area 21 indicates character i dominance (due to the subtraction order, i.e. 1−i). The difference matrix would appear differently if the subtraction order was altered.

However, any method identifying locations of differences between images may be used. According to an example of embodiment of the present invention, the template images representing the candidate characters are used to identify the differences between the candidate characters. Further, the locations of these areas comprising such differentiating features are then identified in a sampled character instance that is uncertainly recognized. The content of these areas in the sampled character instance is then investigated to identify which template image that comprises features represented in these areas. This identification is then the correct identification of the sampled character instance. The following steps of a method are an example of embodiment of the present invention:

The method resolves doubts about contradicting output data from an Optical Character Recognition (OCR) system, wherein the output data comprises pixel images of characters as they have been encountered in an image of a text document being processed by the OCR system, and wherein a first subset of the output data represents images of characters that have been recognized to a degree of certainty above a predefined level, and wherein the output data further comprises a second subset of characters comprising at least a first candidate character image and a second character image being identified as being substantially equal probable identifications for a same exemplar of a sampled character instance from the text document being processed by the OCR system, wherein the method comprises the steps of:
  a) searching through the first subset of the output data identifying images of characters having an image quality above a predefined level, and using these character images as a set of template images for characters,
  b) comparing the first candidate character image and the second candidate character image with each of the respective template images identifying a first template image representing the first candidate character image and a second template image representing the second candidate character image, respectively,
  c) comparing the first template image with the second template image identifying a first displacement between these images, and aligning the first template image relative to the second template image according to the first displacement,
  d) identifying locations of areas comprising features differentiating the first template image form the second template image in the aligned images, expressing the location information of these areas relative to the aligned images,
  e) comparing the image of the sampled character instance with either the first template image or the second template image identifying a second displacement, and then aligning the image of the sampled character instance with either the first template image or the second template image according to the second displacement,
  f) using the location information from d) to identify corresponding areas in the aligned image of the sampled character instance, and then comparing image contents of the located areas by calculating mean values of the pixel values comprised in the located areas of the sampled character instance and then subtracting these respective mean values, wherein the result of the subtraction together with the actually selected template image used when identifying the second displacement provides a criterion for selecting either the first candidate character or the second character candidate as the identified character for the sampled character instance.

Further method steps in another example of embodiment of the present invention comprise method steps for selecting the correct template image by:
if using the first template image when identifying the second displacement, and if the result of the subtraction of the calculated mean values is above a first predefined threshold level, this implies that the first template image is the correct identification for the sampled character instance, whereas a negative result of the subtraction of the mean values below a second threshold level implies that the second template image is the correct identification for the sampled character instance, whereas when a result of the subtraction of the mean values provides a value in-between the first and second threshold level, this implies that neither the first nor the second template image can be selected conclusively.

In another example of embodiment:
if using the second template image when identifying the second displacement, and if the result of the subtraction of the calculated mean values is above a first predefined threshold level, this implies that the second template image is the correct identification for the sampled character instance, whereas a negative result of the subtraction of the mean values below a second threshold level implies that the first template image is the correct identification for the sampled character instance, whereas when a result of the subtraction of the mean values provides a value in-between the first and second threshold level, this implies that neither the first nor the second template image can be selected conclusively.

Throughout this description a reference will be made to positive valued areas and negative valued areas when referring the difference matrix in the meaning that the respective positive areas and negative areas illustrates respectively dominance or insignificance of a difference of the images of areas related to the subtraction order of the candidate character images. The actual step of selecting a correct candidate character takes into account the subtraction order to be able to resolve the selection. Therefore, any reference and/or comprehension of a positive valued area or negative valued area must take into account the subtraction order to be interpreted correctly.

In the process described above the positive valued areas and negative areas provides information about the locations wherein differences between the candidates character images appears. An important aspect of the present invention is that this location is the actual area wherein the difference appears. Due to noise and inaccurate threshold of images of documents etc., as known to a person skilled in the art, the area would not precisely provide contour information about the graphical appearance of a difference. However, by for example correlating pixels bounded by the area related to the location of the differences with similar areas in candidate character images, the pixels constituting the graphical feature representing the difference will be accounted for. Therefore, the location information according to the present invention is sufficient to establish a measure of similarity between areas in the respective images, for example by correlation as known to a person skilled in the art.

However, according to another aspect of the present invention, the measurement of similarity between the respective areas can be improved if the positive valued areas and negative valued areas are filtered. This would provide a filtering of grey levels inside the respective areas providing a removal of noisy grey levels. In further steps according to the present invention, the contour of the areas may also be altered, for example by using a priori knowledge about characters in the image, thereby providing an area having a contour representing the graphical appearance of the difference more precisely. Examples of embodiments using such aspects of the present invention will be disclosed below.

According to an example of embodiment of the present invention such positive and negative areas can be better analyzed if these areas are filtered by using a threshold level to filter pixel values in difference areas. For example, FIG. 4 illustrates the resulting matrix if pixels are selected only if they have grey level values above 25% of the maximum value identified in the positive areas, and which are smaller than 25% of the minimum value. The Op-art pattern areas 20 in FIG. 4 are the remaining positive areas, while the herringbone pattern 21 represents the remaining negative area after such a filtering of the difference matrix in FIG. 3. As indicated in FIG. 4, by the chess board patterned areas, there can be some small "islands" of areas representing positive areas. Such small areas can be removed by additional filtering removing areas with areas below a preset threshold level. The areas referenced by numeral 22 will be removed.

Figure 5A:
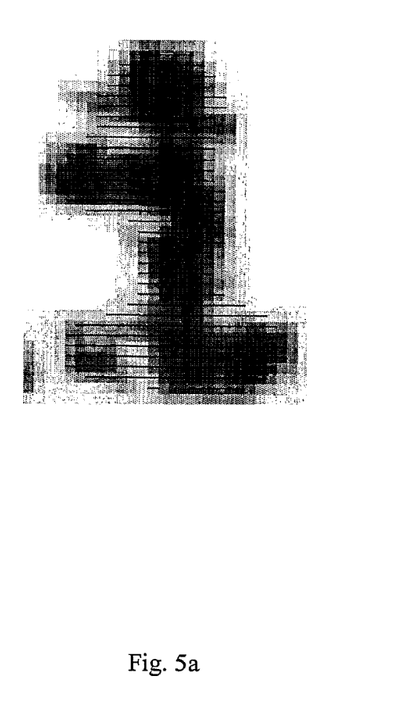
FIG. 5 illustrates an example of sampled character instances correlated with a template from FIG. 1.
Figure 5B:
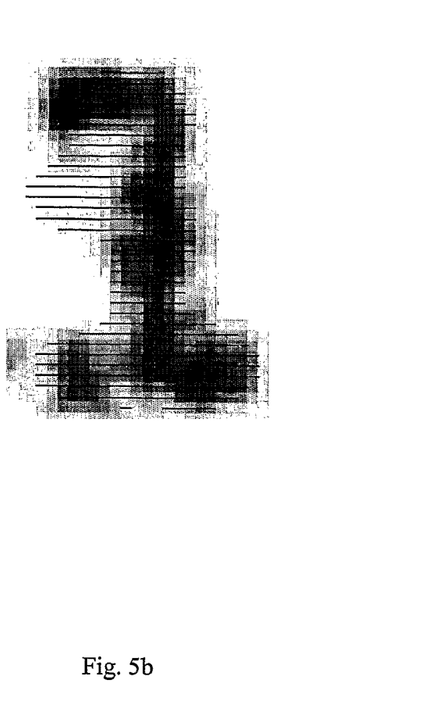

Further steps according to the present invention comprise identifying a second displacement between the image of the sampled character instance and one of the candidate characters. The sampled character instance may be aligned with the selected candidate character. FIG. 5 illustrates two different sampled image instances overlaid the template image for i. The second displacement is (−2, 2) for the left image while the second displacement is (0, 1) for the right image.

Figure 6A:
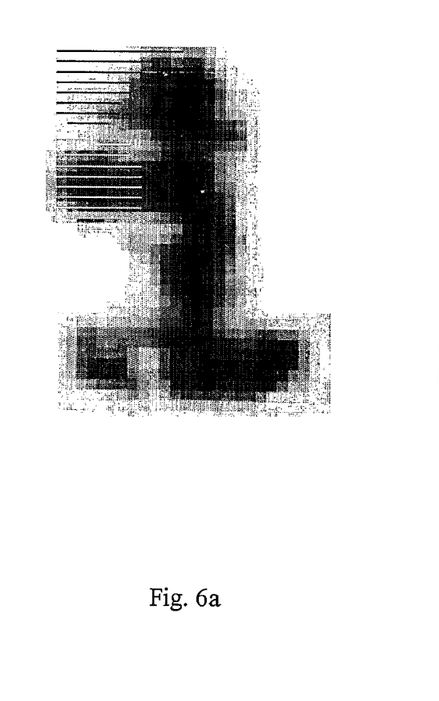
FIG. 6 illustrates difference areas from FIG. 5.
Figure 6B:
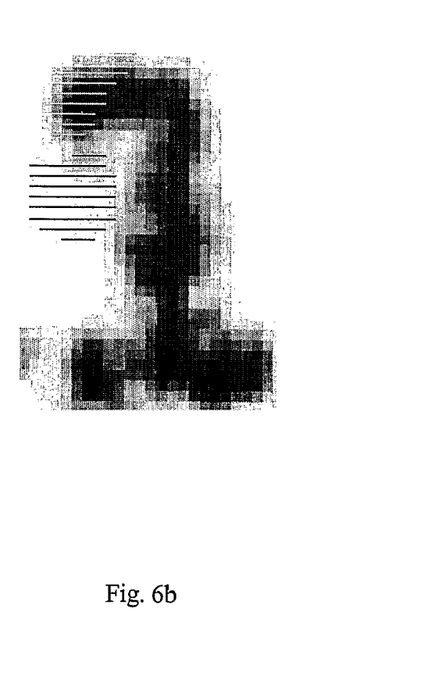

When the image of the sampled character instance is aligned with one of the candidate characters, the location information from the difference matrix can be used to identify the same locations in the image of the character instance. FIG. 6 illustrates respective positive and negative areas as black and white horizontal stripes. In an example of embodiment of the present invention, the mean values of the pixel values (grey level values) are calculated for each respective identified positive area and negative area. The difference of the means is then used to identify which character candidate is the correct choice for the uncertainly recognized character.

Table I depicts examples of the result of means of values from the respective positive and negative areas.

TABLE I

| Sample | Mean of positive valued area | Mean of negative valued area | Difference of means |
|---|---|---|---|
| Sample 1 | 190 | 107 | 83 |
| Sample 2 | 167 | 227 | −60 |

Figure 7A:
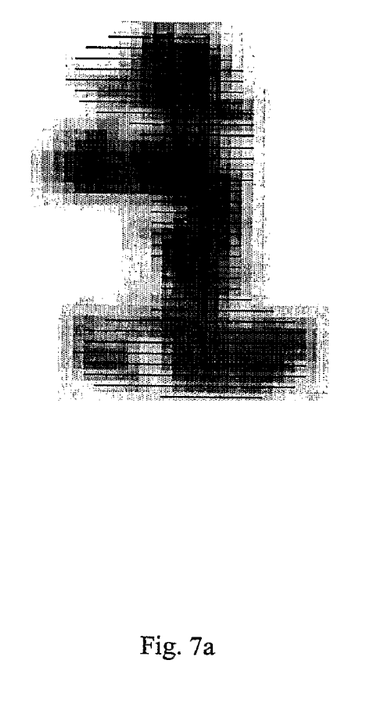
FIG. 7 illustrates an example of sampled character instances correlated with another template from FIG. 1.
Figure 7B:
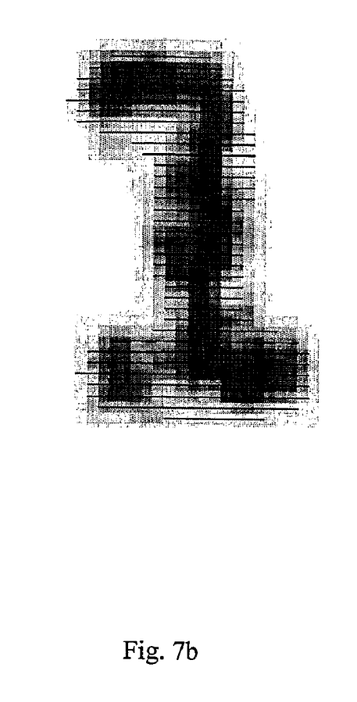
Figure 8A:
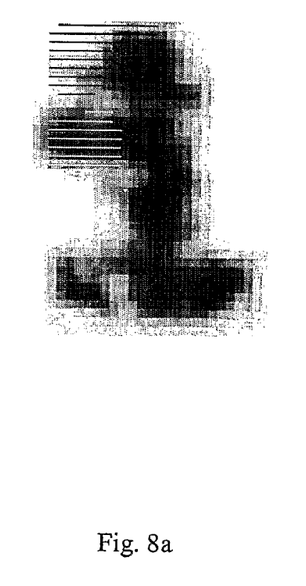
FIG. 8 illustrates difference areas from FIG. 7.
Figure 8B:
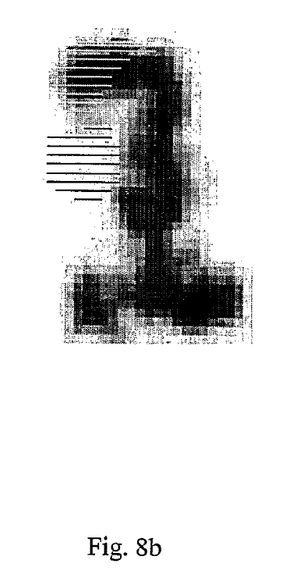

Table II illustrates examples of the mean values when the sampled character instance is correlated with the other candidate character. This is illustrated in FIG. 7 and FIG. 8, respectively. The selection of a candidate character is based on tracing backwards which character instance was correlated with the sampled character candidate. If the first candidate character was used, a positive difference of the means indicates that it is the to first candidate character. A negative result of the subtraction indicates the other candidate character.

TABLE II

| Sample | Mean of positive valued are | Mean of negative area | Difference of means |
|---|---|---|---|
| Sample 1 | 165 | 110 | 54 |
| Sample 2 | 138 | 224 | −86 |

According to other aspects of the present invention, alternative embodiments of the present invention comprise steps of renormalization of positive and negative valued areas in the difference matrix. The renormalization factor can be different for each respective area. The renormalization makes the arithmetic consistent across different images.

According to other examples of embodiments of the present invention, different filtering techniques may be applied on character images, for example to enhance graphical details, reduce noise etc. For example, the content of the difference matrix may be filtered with a threshold of the grey level values above and/or under a threshold level, eliminating unnecessary details. An opening morphology operator can also be applied as known to a person skilled in the art.

Another aspect of the present invention is that many candidate characters may be reported form the OCR system as substantial equal candidates for the uncertainly recognized character. According to an example of embodiment of the present invention, possible pair of candidate characters is formed. For example, if the OCR system reports three candidate characters C1, C2 and C3, the following pairs may be formed: C1 and C2, C1 and C3, C2 and C3, C2 and C1, C2 and C3, C3 and C1, C3 and C2, which are all possible combinations of C1, C2 and C3, which can be used to check the consistency of the outcome of comparing for example C1 and C2, or when comparing C2 and C1 which should provide the same outcome. Another example of possible pairs would be C1 and C2, C1 and C3, and C2 and C3. When performing a method according to the present invention, C1 and C2 are treated as the first character candidate and C2 as the second candidate character. The process is executed once more, wherein C1 and C3 is the respective first and second character candidate. Thereafter C2 and C3 are processed, and so on. After all possible pairs have been processed three possible outcomes are possible. The correct choice is to select the character candidate that is the outcome from a plurality of the pair of combinations. In another example of embodiment, the selection of the correct candidate character is based on identifying a pair of candidate characters providing the highest correlation with the sampled character instance, and then selecting the outcome of the test for this particular pair as the correct selection for the sampled character instance. In another example of embodiments of the present invention, all candidate characters reported from the OCR system is correlated with the sampled character instance. If the correlation falls below a predefined threshold level, this candidate character is discarded from the investigation according to the present invention.

According to yet another aspect of the present invention, the template images may improve the performance of the present invention when images of characters are grouped together in character classes. For example, the OCR system may report many instances of images of a same character as being recognized certainly above a preset threshold level. All such images of the same character is then added together by adding the grey level of each respective corresponding character image pixel after alignment, and weighting the sum with the number of added images. This aspect of the present invention enhances the graphical quality of the respective images of the template characters, firstly by being images of real images as encountered in a document, and secondly by averaging noise components through the addition and weighting of the pixel values, as known to a person skilled in the art.

According to an example of embodiment of the present invention, the following steps are performed when creating character classes:

I. choosing randomly three samples in a class, correlating all the combinations of these three samples, and then selecting the pair of correlated images providing a correlation above a predefined threshold level as a starting point for a template for this character class, II. if none of the combinations of pairs selected in I provides a correlation above the threshold level, select other samples in the class until a pair is obtained with a correlation above the predefined threshold level, III. if none of the pair of samples in II is found to have a correlation above the predefined threshold level, discard this class from further use, IV. for the initial pair identified in I or II, correlate the images of the pair identifying a displacement between them before generating an aligned accumulated template image of the images that are used as a starting template image for the respective character class, V. for all the remaining samples in the class, correlate them with the accumulated template in IV to identify a displacement between them, and if the correlation is above the predefined threshold, align the images before adding the aligned images to the accumulated image in IV, VI. if some of the aligned images used in V comprise parts of the image that is outside the starting template in IV, expand the accumulated template after all samples have been used to be within a bounding box defined as the median size of the bounding boxes of a subset of images representing a majority of the images.

According to yet another example of embodiment of the present invention, the designation or computation of the respective positive and negative areas of the difference matrix comprises identifying a median of averaged difference areas of classes representing candidate characters as a designation criteria, for example if the median is 38, a difference area could be designated as being a positive area if the averaged value of a difference area of a character instance is above 38, otherwise zero.

Figure 9A:
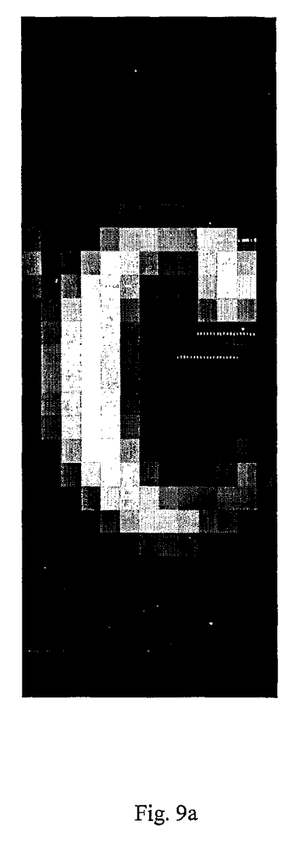
FIG. 9 illustrates a difference matrix of a respective character c and e.
Figure 9B:
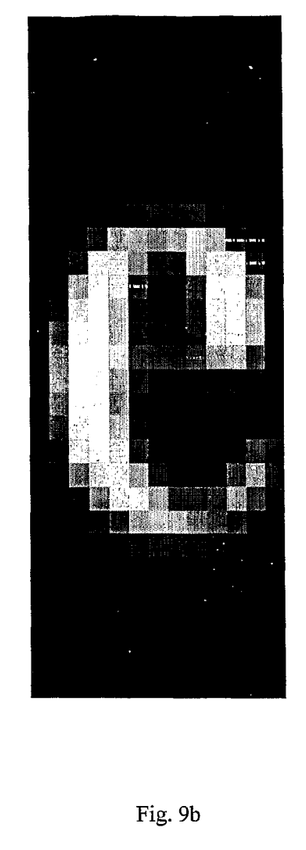
Figure 10:
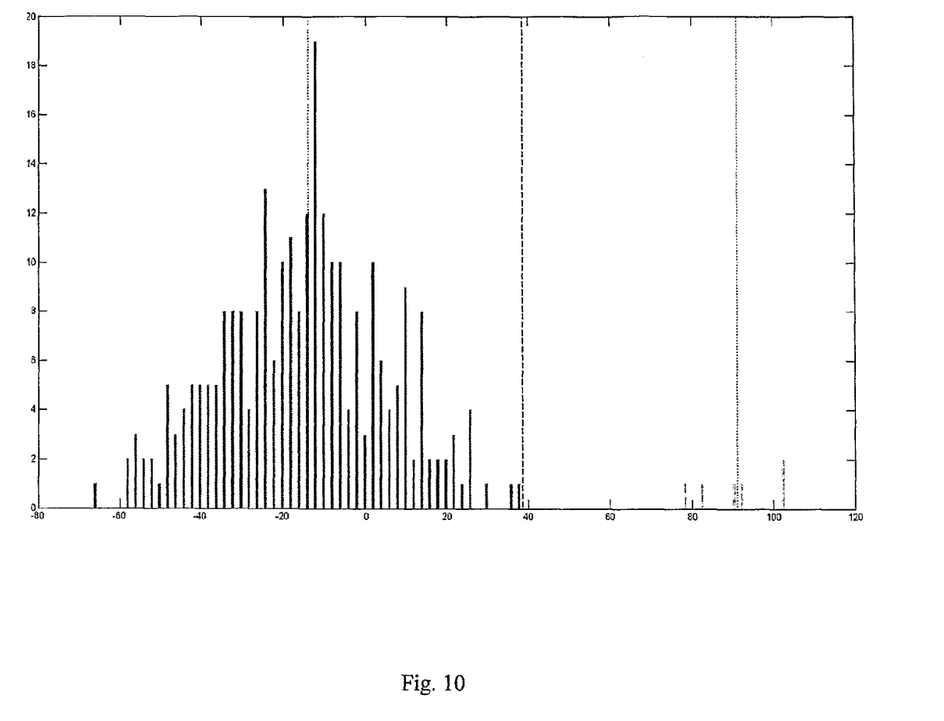
FIG. 10 illustrates an example of a median used to designate areas as positive valued areas, or negative areas in FIG. 9.

FIG. 9 illustrates an example of the character c and e, wherein the left image illustrates a difference matrix provided by subtracting pixel values from c and e in the order c-e, while the other image illustrates the difference matrix for c and e in the order e-c. In an example of embodiment of the present invention, such subtractions are performed with all, or at least a substantial number of images of a class, for example the classes representing c and e in this example. FIG. 10 illustrates how the averaged difference values for some exemplars of c and e images are distributed in a histogram. The height of a bar (the vertical axis) is the number of instances of a class member having the averaged difference value indicated along the bottom line (the horizontal axis). In the diagram, all averaged difference values indicating a character c are in light grey colours, while all averaged difference values indicating a character e are all in a dark grey colour. The value of all light gray coloured and dark grey coloured bars are grouped separately, and the median value of these values are calculated as being located at the number 38 position on the horizontal axis, and is used as the limit designating areas as being positive or negative valued areas in the difference matrix before using the difference matrix in the steps of the present invention selecting the correct character instance as the correct selection for the sampled character instance.

Figure 11A:
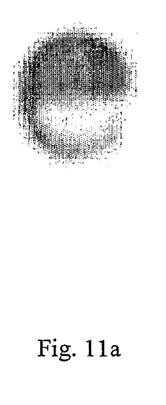
FIG. 11 illustrates an example of a scaled character image and correction of scale.
Figure 11B:
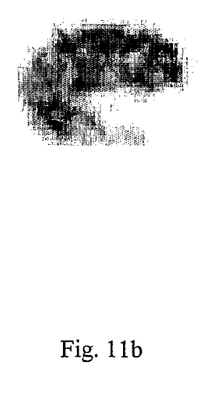
Figure 11C:
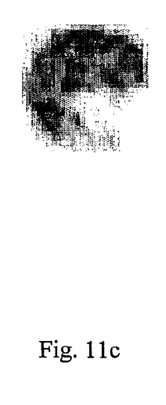
Figure 12A:
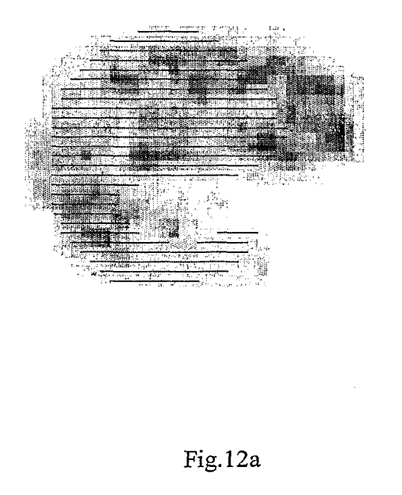
FIG. 12 illustrates correlation between a character template image and images depicted in FIG. 11.
Figure 12B:
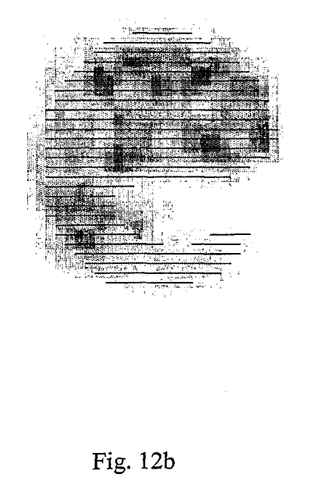

FIG. 11 illustrates another type of problem providing difficulties when identifying images of text. For example, when scanning a book page on a flat bed scanner, images of characters close to the binding will appear curved, and when converted to a bitmap image in the OCR system, characters will appear scaled differently dependent on the location on the page they are imprinted. The same type of problems can occur if a page is photographed. In FIG. 11 the image 11a represents the template for the character e while 11b is an image of a wrongly scaled character e. This may cause problems when performing different steps of embodiments of the present invention comprising correlations. In FIG. 12a there is depicted an image of FIG. 11b overlaid the template image in FIG. 11a. The maximum correlation value in this example is 0.878. However, the templates provide an opportunity to estimate widths and heights of characters as encountered in the document. For example, the median of all pixels representing the foreground (the "on" pixels constituting the character body) in a class can be used to estimate both width and height of a character. This information can then be used to correct the scaling of an image, for example the image in FIG. 11b, providing a corrected image as depicted in FIG. 11c. The correction can be done for example by fitting as much as possible of the pixels in the wrongly scaled character image into corresponding positions in the corrected image by using morphological operations as known to a person skilled in the art. FIG. 12b illustrates the resulting correlation between the template in FIG. 11a and the image in FIG. 11c. The maximum correlation for the corrected image is 0.945, which is a significant improvement of the correlation.

According to another aspect of the present invention, rotation of characters can be dealt with in a similar fashion. In an example of embodiment of the present invention, seek and trial processes are performed wherein randomly selected rotation angles are used before correlating a rotated exemplar of the image with the template images. The rotation angle providing the highest correlation is the correct rotation angle, which can be saved and used in rotating other images having a probable rotation of the character image.

Figure 13A:
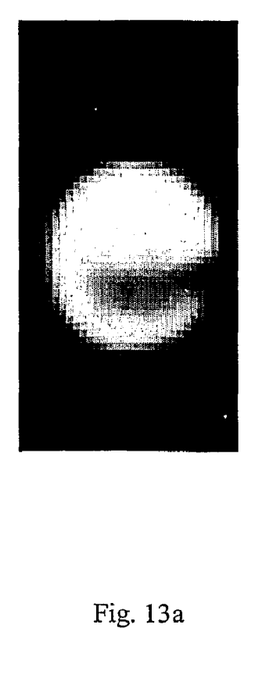
FIG. 13 illustrates an example of a character image comprising a systematic error in the imprint of the character.
Figure 13B:
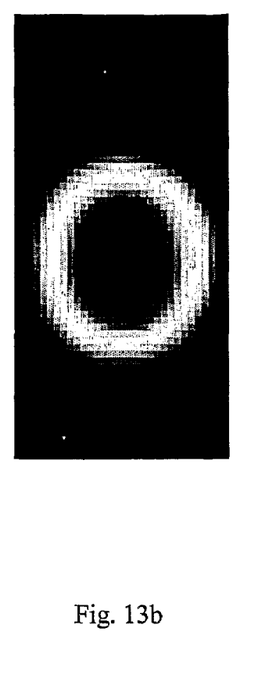
Figure 13C:
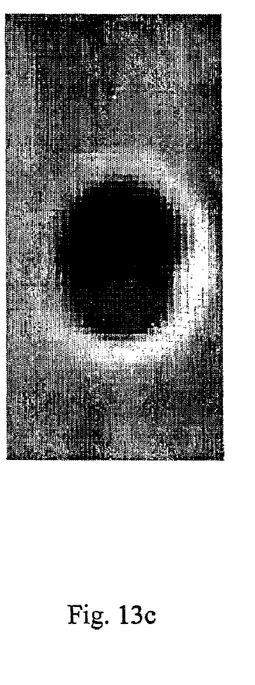
Figure 14:
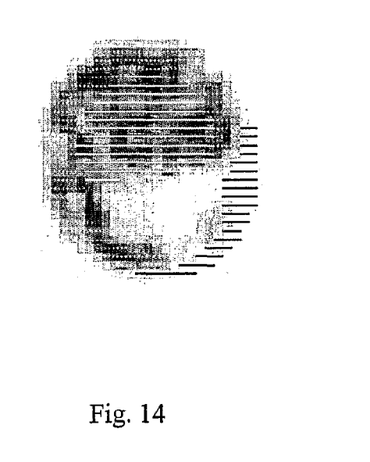
FIG. 14 illustrates difference areas from FIG. 13.

FIG. 13 illustrates another type of problem that can be solved by embodiments of the present invention. In this example there is a systematic error in the images of the character e. The upper part of the e is always filled, which can be a result from an error in a typewriter, for example. FIG. 13a illustrates a template image of such an e, while the image in FIG. 13b illustrates a template image of an o from the same document. FIG. 13c illustrates the difference matrix of these templates. FIG. 14 illustrates the difference areas, wherein the white stippled areas represents e dominance while the black stippled areas represent o dominance. In this case an unexpected expanded area is used to establish e dominance. This is a result from the fact that the error in the image representing the character does have a systematic error.

Figure 15:
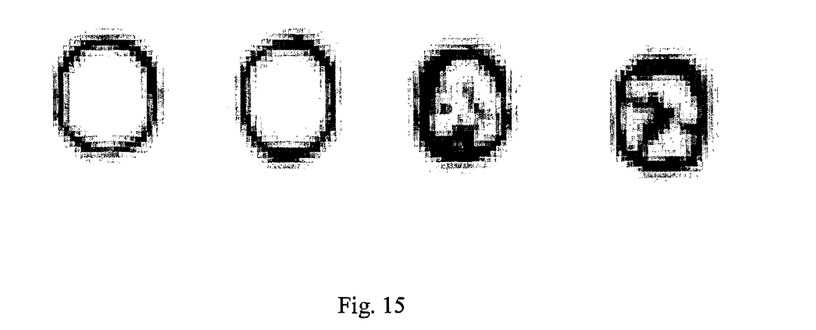
FIG. 15 illustrates an example of noise in an image of a character.
Figure 16:
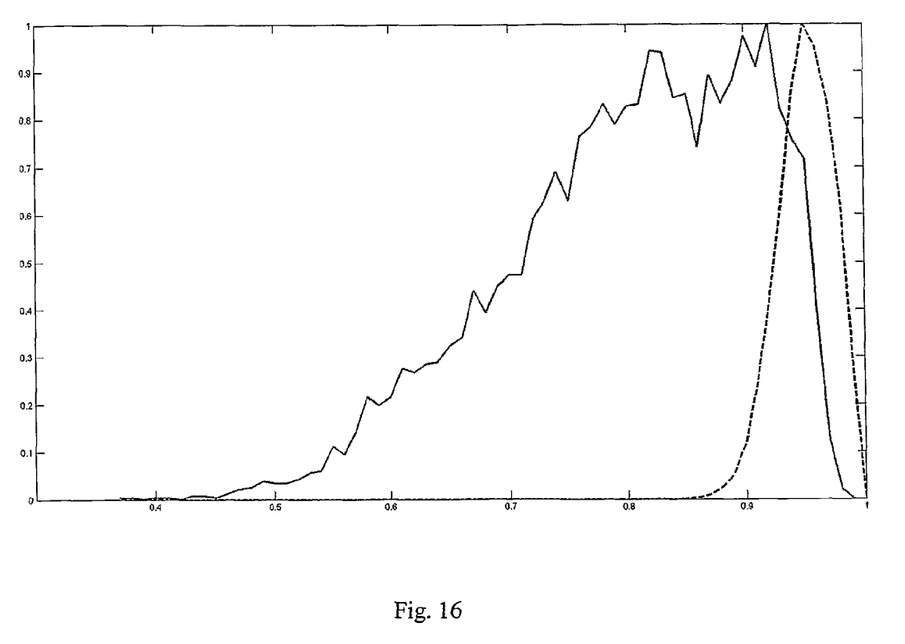
FIG. 16 depicts a histogram of the cross correlation in FIG. 15.

FIG. 15 illustrates an example of problem with noise in the images of characters. In the figure there are two images of an O without noise, and two images comprising noise. FIG. 16 illustrates the cross correlation between the O's of this example with O's of a document comprising low noise. The histogram in FIG. 16 depicts that there is a distribution as expected for the cross correlation of the noisy character images, shown as a solid line, while the low noise characters provides much a less distribution as shown with the dashed line. The FIG. 16 is scaled such that maximum correlation value is 1.

Figure 17A:
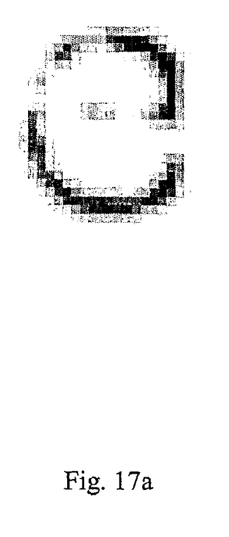
FIG. 17 illustrates another example of noise in character images.
Figure 17B:
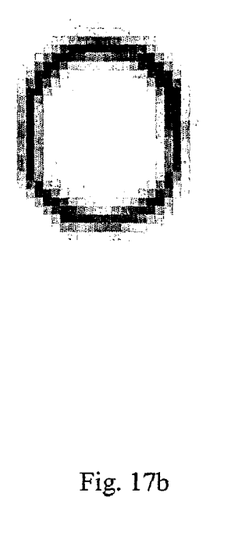
Figure 17C:
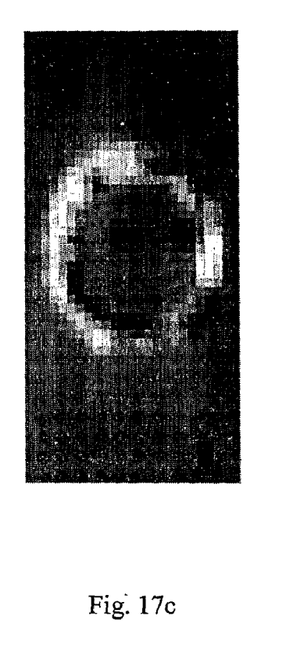

The distribution of the cross correlations provides a metric for the noise level. This can serve as an indication to decide if any actions need to be taken to account for the noise present in the template images or character classes. FIG. 17 illustrates an example wherein a character image of an e (FIG. 17a) and o (FIG. 17b) provides a difference matrix (FIG. 17c) comprising difference areas arising from noise. According to an aspect of the present invention, a priori knowledge of character instances can be used to improve the information provided for in the difference matrix. In this example of embodiment, the solution is to shape a part of the difference arising from the e to clearly indicate a feature of either the e or the o such that the difference matrix can be used according to the present invention to provide a selection of the correct character candidate for the sampled character instance. The obvious a priori knowledge to use is the topological feature that separates the e from the o, the horizontal line in the centre of the e.

According to an example of embodiment of the present invention, the following steps may be used:

1. Identify the positive areas in the middle of the 'e'
2. Estimate the height of these areas (stroke width of horizontal line)
3. Estimate the mean stroke width of the left and the right side of the 'e'
4. Generate a line with the estimated width from the left outer contour plus the estimated stroke width to the right.
5. Identify a negative area close to and under to right of the positive area
6. Disregard all other positive and negative areas.

Figure 18:
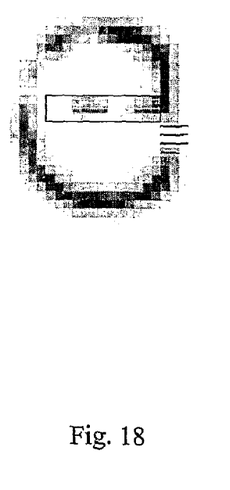
FIG. 18 illustrates an example of using a priori knowledge to identify positive and negative areas in a difference matrix according to the present invention.

The result of this manipulation provides an image as illustrated in FIG. 18. The e dominance is within the enclosing black rectangle.

In some instances, there will be missing character images in a template set or class according to the present invention. This would provide a situation wherein there is for example only one candidate character that does have a template image. Such situations can occur for example if a character indeed is rarely used in the language of the document. For example, in Norwegian the character c is a rarely used character in contrast to other languages wherein c is the most common used character. A typical confusion alternative for the character c is the character e. It is reasonable to expect that there will be a template present for the character e, but probably not for the character c. When there is identified that a template is missing, a synthetic template image can be provided for on basis of an already existing template image that resembles the missing template image. In this way, some of the graphical attributes of characters as they are encountered in the document being processed by the OCR system will be part of the synthesized template image.

The invention claimed is:

1. A method for resolving contradicting output data from an Optical Character Recognition (OCR) system, wherein the output data comprises pixel images of characters as they have been encountered in an image of a text document being processed by the OCR system, and wherein a first subset of the output data represents images of characters that have been recognized to a degree of certainty above a predefined level, and wherein the output data further comprises a second subset of characters comprising at least a first candidate character image and a second character image being identified as being substantially equal probable identifications for a same exemplar of a sampled character instance from the text document being processed by the OCR system, the method comprises the steps of:

a) searching through the first subset of the output data identifying images of characters having an image quality above a predefined level, and using these character images as a set of template images for characters,
b) comparing the first candidate character image and the second candidate character image with each of the respective template images identifying a first template image representing the first candidate character image and a second template image representing the second candidate character image, respectively,
c) comparing the first template image with the second template image identifying a first displacement between these images, and aligning the first template image relative to the second template image according to the first displacement,
d) identifying locations of areas comprising features differentiating the first template image form the second template image in the aligned images, expressing the location information of these areas relative to the aligned images,
e) comparing the image of the sampled character instance with either the first template image or the second template image identifying a second displacement, and then aligning the image of the sampled character instance with either the first template image or the second template image according to the second displacement,
f) using the location information from d) to identify corresponding areas in the aligned image of the sampled character instance, and then comparing image contents of the located areas by calculating mean values of the pixel values comprised in the located areas of the sampled character instance and then subtracting these respective mean values, wherein the result of the subtraction together with the actually selected template image used when identifying the second displacement provides a criterion for selecting either the first candidate character or the second character candidate as the identified character for the sampled character instance.

2. The method according to claim 1, wherein the identification of the template image as the correct identification of the sampled character instance further comprises:
if using the first template image when identifying the second displacement, and if the result of the subtraction of the calculated mean values is above a first predefined threshold level, this implies that the first template image is the correct identification for the sampled character instance, whereas a negative result of the subtraction of the mean values below a second threshold level implies that the second template image is the correct identification for the sampled character instance, whereas when a result of the subtraction of the mean values provides a value in-between the first and second threshold level, this implies that neither the first nor the second template image can be selected conclusively.

3. The method according to claim 1, wherein the identification of the template image as the correct identification of the sampled character instance further comprises:
if using the second template image when identifying the second displacement, and if the result of the subtraction of the calculated mean values is above a first predefined threshold level, this implies that the second template image is the correct identification for the sampled character instance, whereas a negative result of the subtraction of the mean values below a second threshold level implies that the first template image is the correct identification for the sampled character instance, whereas when a result of the subtraction of the mean values provides a value in-between the first and second threshold level, this implies that neither the first nor the second template image can be selected conclusively.

4. The method according to claim 1, wherein the second subset of the output data comprises a plurality of candidate character images, the method further comprises the steps of:
   g) constituting possible combinations of pairs of respective members of the second subset of the output data, and then using members of each constituted pair of candidate character images as the first candidate character image and the second candidate character image, respectively, one pair at a time, in the steps a) to f), and
   h) wherein step f) further comprises recording the results of all the comparisons of the images, and then selecting the template image from the constituted pair of candidate character images providing a highest degree of conformity above the predefined level as the correct identification for the sampled character instance.

5. The method according to claim 1, wherein the steps comprising comparing images is provide for by correlating pixel values in the respective images being compared, and using the maximum correlation values to identify either the first and second displacements, respectively, for identifying template images, and for comparing image contents of areas in the respective aligned images.

6. The method according to claim 1, wherein the step of identifying the locations of areas comprising features differentiating the first template image from the second template image comprises generating a difference matrix by subtracting pixels values from the first aligned template image and the second aligned template image, wherein the pixel values are located at locations corresponding to matrix cell positions, and then identifying positive valued areas in the difference matrix above a predefined threshold level, and negative valued areas below another predefined threshold level, and discarding other areas, as the areas comprising the differentiating features.

7. The method according to claim 6, wherein the subtraction order between the first template image and the second template image is used when identifying either the first template image or the second template image as the correct identification for the sampled character instance.

8. The method according to claim 7, wherein a positive valued area indicates a first template image dominance in the positive valued area if the second template image is subtracted from the first template image, whereas a positive valued area indicates a second template image dominance in the positive valued area if the first template image is subtracted from the second template image.

9. The method according to claim 6, further comprising renormalizing all absolute values of the difference matrix to be between zero and one.

10. The method according to claim 9, further comprising using separate renormalizing factors for the positive valued areas and the negative valued areas, respectively.

11. The method according to claim 9, further comprises using an opening morphology operator on the bitmap outcomes from using the low and high threshold levels, respectively.

12. The method according to claim 6, further comprises using threshold levels to filter the content of the difference matrix cells with a low threshold level and a high threshold level, respectively, and then combining the bitmap outcomes from each use of the respective threshold levels into one bitmap image stored in the difference matrix, and then removing connected pixels that occupies areas smaller than a predefined limit before identifying the locations of the positive and negative areas of the difference matrix.

13. Method according to claim 6,
   wherein step a) comprises sorting all reported identified characters in the first subset above a predefined threshold level into classes, wherein each class represents the same identified character,
   further comprising using all member images of a template class when establishing positive valued and negative valued areas by subtracting pixel values from respective members of the first template class from respective members of the second template class, and using the mean values of these subtractions as the result of the subtractions in the difference matrix.

14. Method according to claim 6, further comprising using a priory knowledge to manipulate contours of the identified positive and negative valued areas.

15. The method according to claim 1, wherein the step of identifying the second displacement comprises correlating the image of the character instance with all the template images in the template set, and using the template image with maximum correlation with the image of the character instance to obtain the second displacement.

16. The method according to claim 1, wherein the step of identifying the correct template image as the identification for the sampled character instance comprises using the template for the first candidate character and then performing other steps of the method with this selection, and then performing the same steps with the template for the second candidate character, and then controlling that there is a same outcome of the results of the comparisons when applying the first and second template image, respectively, and then using the template image providing the same result of the comparisons as the correct identification for the sampled character instance.

17. The method according to claim 16, wherein a situation when the use of the two respective template images provides one result from the comparison that is conclusive for one of the two template images, and the other template image provides a non conclusive result, this situation further comprises the step of selecting the template image providing a conclusive result as the correctly identified template image for the sampled character instance.

18. The method according to claim 1, wherein step a) comprises sorting all reported identified characters in the first subset above a predefined threshold level into classes, wherein each class represents the same identified character, and then performing the steps of:
   VII. choosing randomly three samples in a class, correlating all the combinations of these three samples, and then selecting the pair of correlated images providing a correlation above a predefined threshold level as a starting point for a template for this character class,
   VIII. if none of the combinations of pairs selected in I provides a correlation above the threshold level, select other samples in the class until a pair is obtained with a correlation above the predefined threshold level,
   IX. if none of the pair of samples in II is found to have a correlation above the predefined threshold level, discard this class from further use,
   X. for the initial pair identified in I or II, correlate the images of the pair identifying a displacement between them before generating an aligned accumulated template image of the images that are used as a starting template image for the respective character class,
   XI. for all the remaining samples in the class, correlate them with the accumulated template in IV to identify a displacement between them, and if the correlation is above the predefined threshold, align the images before adding the aligned images to the accumulated image in IV, XII. if some of the aligned images used in V comprise parts of the image that is outside the starting template in IV, expand the accumulated template after all samples have been used.

19. The method according to claim 18, wherein the accumulation of aligned images into the template for a class representing a character, further comprises adding corresponding grey level pixel values from corresponding locations in the aligned images together such that each grey level pixel value is weighted with an inverse of the number of currently accumulated aligned images in the template image for the class before performing the addition.

20. Method according to claim 18, wherein a situation when a character class is missing due to missing identified character images from the document being processed in the OCR system, a missing template class is synthesized from another existing template class resembling the missing template class.

* * * * *